US011927204B2

(12) United States Patent
Gabor

(10) Patent No.: US 11,927,204 B2
(45) Date of Patent: *Mar. 12, 2024

(54) HYDRAULIC POWERING SYSTEM AND METHOD OF OPERATING A HYDRAULIC POWERING SYSTEM

(71) Applicant: Industries Mailhot Inc., Saint-Jacques (CA)

(72) Inventor: Jeremy J. Gabor, Hatley, WI (US)

(73) Assignee: Industries Mailhot Inc., Saint-Jacques (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,232

(22) Filed: Oct. 17, 2022

(65) Prior Publication Data

US 2023/0141425 A1 May 11, 2023

Related U.S. Application Data

(63) Continuation of application No. 16/891,383, filed on Jun. 3, 2020, now Pat. No. 11,493,060.

(Continued)

(51) Int. Cl.

*F15B 1/22* (2006.01)
*F15B 1/26* (2006.01)

(Continued)

(52) U.S. Cl.

CPC ................ *F15B 1/22* (2013.01); *F15B 1/265* (2013.01); *F15B 15/04* (2013.01); *F15B 21/14* (2013.01)

(58) Field of Classification Search

CPC .. F15B 15/04; F15B 15/14; F15B 1/26; F15B 1/22; F15B 1/265; F15B 2211/70;

(Continued)

(56) References Cited

U.S. PATENT DOCUMENTS 3,763,636 A 10/1973 Bliss
4,590,763 A 5/1986 Augoyard et al.

(Continued)

*Primary Examiner* — Michael Leslie
*Assistant Examiner* — Daniel S Collins
(74) *Attorney, Agent, or Firm* — Merchant & Gould P.C.

(57) ABSTRACT

A hydraulic powering system includes a hydraulic cylinder, an accumulator, and a manifold assembly. The hydraulic cylinder includes: (i) a hydraulic cylinder construction having a hydraulic cylinder wall and first and second hydraulic cylinder end caps forming an internal volume, a piston constructed to slide within the internal volume between the first and second hydraulic cylinder end caps and dividing the internal volume into an extend region and a retract region, and a piston rod extending from the piston and through the retract region and one of the first and second end caps to outside the hydraulic cylinder; (ii) an extend port in fluid connection with the extend region of the hydraulic cylinder; and (iii) a retract port in fluid communication with the retract region of the hydraulic cylinder. The accumulator includes: (i) an accumulator construction having an accumulator wall and first and second accumulator end caps forming an accumulator internal volume, an accumulator piston constructed to slide within the accumulator internal volume between the first and second accumulator end caps and dividing the accumulator internal volume into a hydraulic fluid region and a compressible gas region; and (ii) a hydraulic fluid port in fluid communication with the hydraulic fluid region of the accumulator. The manifold assembly includes a plurality of passageways therethrough providing fluid connection between: (i) a hydraulic fluid extend source and the hydraulic cylinder extend port and the accumulator hydraulic fluid port; and (ii) a hydraulic fluid retract source and the hydraulic cylinder retract port and the accumulator hydraulic fluid port. A method of operating a hydraulic powering system is described.

17 Claims, 14 Drawing Sheets

Related U.S. Application Data

(60) Provisional application No. 62/857,071, filed on Jun. 4, 2019.

(51) Int. Cl.
*F15B 15/04* (2006.01)
*F15B 21/14* (2006.01)

(58) Field of Classification Search
CPC .............. F15B 2211/75; F15B 2211/62; F15B 2211/254; F15B 2211/212
See application file for complete search history.

(56) References Cited

U.S. PATENT DOCUMENTS

| | | | | |
|---|---|---|---|---|
| 5,706,657 | A | 1/1998 | Amborski et al. | |
| 5,733,095 | A | 3/1998 | Palmer et al. | |
| 5,992,146 | A | 11/1999 | Hausman | |
| 6,167,701 | B1 | 1/2001 | Hatcher et al. | |
| 6,351,944 | B1 | 3/2002 | Fertig et al. | |
| 6,519,939 | B1 | 2/2003 | Duff | |
| 6,938,413 | B2 | 9/2005 | Harnischfeger | |
| 7,251,936 | B2 | 8/2007 | Kühn et al. | |
| 7,293,494 | B2 | 11/2007 | Morency et al. | |
| 7,409,826 | B2 | 8/2008 | Epshteyn | |
| 7,591,133 | B2 | 9/2009 | Wright | |
| 7,637,103 | B2 | 12/2009 | Karl et al. | |
| 8,413,677 | B1 | 4/2013 | Coffman et al. | |
| 9,945,396 | B2 | 4/2018 | Shang et al. | |
| 10,184,228 | B2 | 1/2019 | Ito et al. | |
| 11,268,501 | B1 | 3/2022 | Martin | |
| 11,493,060 | B2 * | 11/2022 | Gabor | F15B 1/22 |
| 2004/0088972 | A1 | 5/2004 | Harnischfeger et al. | |
| 2006/0070378 | A1 | 4/2006 | Geiger | |
| 2008/0245067 | A1 | 10/2008 | Rapp et al. | |
| 2009/0120084 | A1 | 5/2009 | Baltes | |
| 2011/0123363 | A1 | 5/2011 | Marica | |
| 2015/0192117 | A1 | 7/2015 | Bridges | |
| 2017/0082212 | A1 | 3/2017 | Swagten et al. | |
| 2018/0266412 | A1 | 9/2018 | Stokkev | |
| 2019/0330923 | A1 | 10/2019 | Gable | |

* cited by examiner

HYDRAULIC POWERING SYSTEM AND METHOD OF OPERATING A HYDRAULIC POWERING SYSTEM

CROSS REFERENCE TO RELATED APPLICATIONS

The present application is a continuation application of application Ser. No. 16/891,383, filed Jun. 3, 2020, now U.S. Pat. No. 11/493,060. Application Ser. No. 16/891,383 claims the benefit of provisional patent Application Ser. No. 62/857,071 filed on Jun. 4, 2019. A claim of priority is made to each of U.S. Ser. No. 16/891,383 and U.S. Ser. No. 62/857,071. The disclosure of each of U.S. Serial No. 16/891,383 and U.S. Serial No. 62/857,071 are incorporated herein in their entirety.

FIELD OF THE DISCLOSURE

The present disclosure relates to a hydraulic powering system and to a method of operating a hydraulic powering system. In particular, the hydraulic powering system includes a hydraulic cylinder, an accumulator, and a manifold assembly providing flow of hydraulic fluid between the hydraulic cylinder and the accumulator. The manifold assembly can also provide flow of hydraulic fluid between the hydraulic cylinder and the accumulator and a source of hydraulic fluid such as a hydraulic pump. The hydraulic powering system can be used in any environment where hydraulic power is desired. One particular area includes the application of hydraulic power for operating a well service pump in the oil and gas industry to assist with hydrocarbon production utilizing various downhole services such as hydraulic fracturing, acidizing, cementing, sand control, well control, and fluid circulation operations.

BACKGROUND

Hydraulic cylinders are often used to create a linear force. The movement of a piston within the hydraulic cylinder, as a result of the application of hydraulic fluid to one side of the piston, translates hydraulic energy from a hydraulic pump into a linear direction. Commonly, a piston rod extends from the piston through an end of the hydraulic cylinder. By application of hydraulic fluid to one side of the piston, the movement of the piston and the piston rod translates the energy into a first linear direction, and application of a hydraulic fluid to the other side of the piston can cause a linear force in the opposite direction. Hydraulic cylinders are often used as actuators on various mechanical devices including, loader arms, buckets, and claws on construction equipment. Hydraulic cylinders can also be used for operating a linear reciprocating, plunger-type pump, commonly referred as a "frac pump" often used to convey or pump a fluid into a well.

Accumulators have been used in power fluid systems to store potential energy for later use. While some accumulators utilize a piston or a diaphragm therein, they typically do not include a piston rod extending from the piston to outside of the accumulator. Instead, accumulators often include a hydraulic fluid on one side of the piston or diaphragm and a compressible material, such as a gas, on the other side of the piston or diaphragm. By compressing the gas, energy can be stored and later released by expanding the gas.

SUMMARY

A hydraulic powering system is described that includes a hydraulic cylinder, an accumulator, and a manifold assembly. The hydraulic cylinder includes: (i) a hydraulic cylinder construction having a hydraulic cylinder wall and first and second hydraulic cylinder end caps forming an internal volume, a piston constructed to slide within the internal volume between the first and second hydraulic cylinder end caps and dividing the internal volume into an extend region and a retract region, and a piston rod extending from the piston and through the retract region and one of the first and second end caps to outside the hydraulic cylinder; (ii) an extend port in fluid connection with the extend region of the hydraulic cylinder; and (iii) a retract port in fluid communication with the retract region of the hydraulic cylinder. The accumulator includes: (i) an accumulator construction having an accumulator wall and first and second accumulator end caps forming an accumulator internal volume, an accumulator piston constructed to slide within the accumulator internal volume between the first and second accumulator end caps and dividing the accumulator internal volume into a hydraulic fluid region and a compressible gas region; and (ii) a hydraulic fluid port in fluid communication with the hydraulic fluid region of the accumulator. The manifold assembly includes a plurality of passageways therethrough providing fluid connection between: (i) a hydraulic fluid extend source and the hydraulic cylinder extend port and the accumulator hydraulic fluid port; and (ii) a hydraulic fluid retract source and the hydraulic cylinder retract port and the accumulator hydraulic fluid port.

A method of operating a hydraulic powering system is described that includes a step of feeding hydraulic fluid from an accumulator to a hydraulic cylinder retract region of a hydraulic cylinder side during a retract stroke of the hydraulic cylinder.

DETAILED DESCRIPTION

Figure 1:
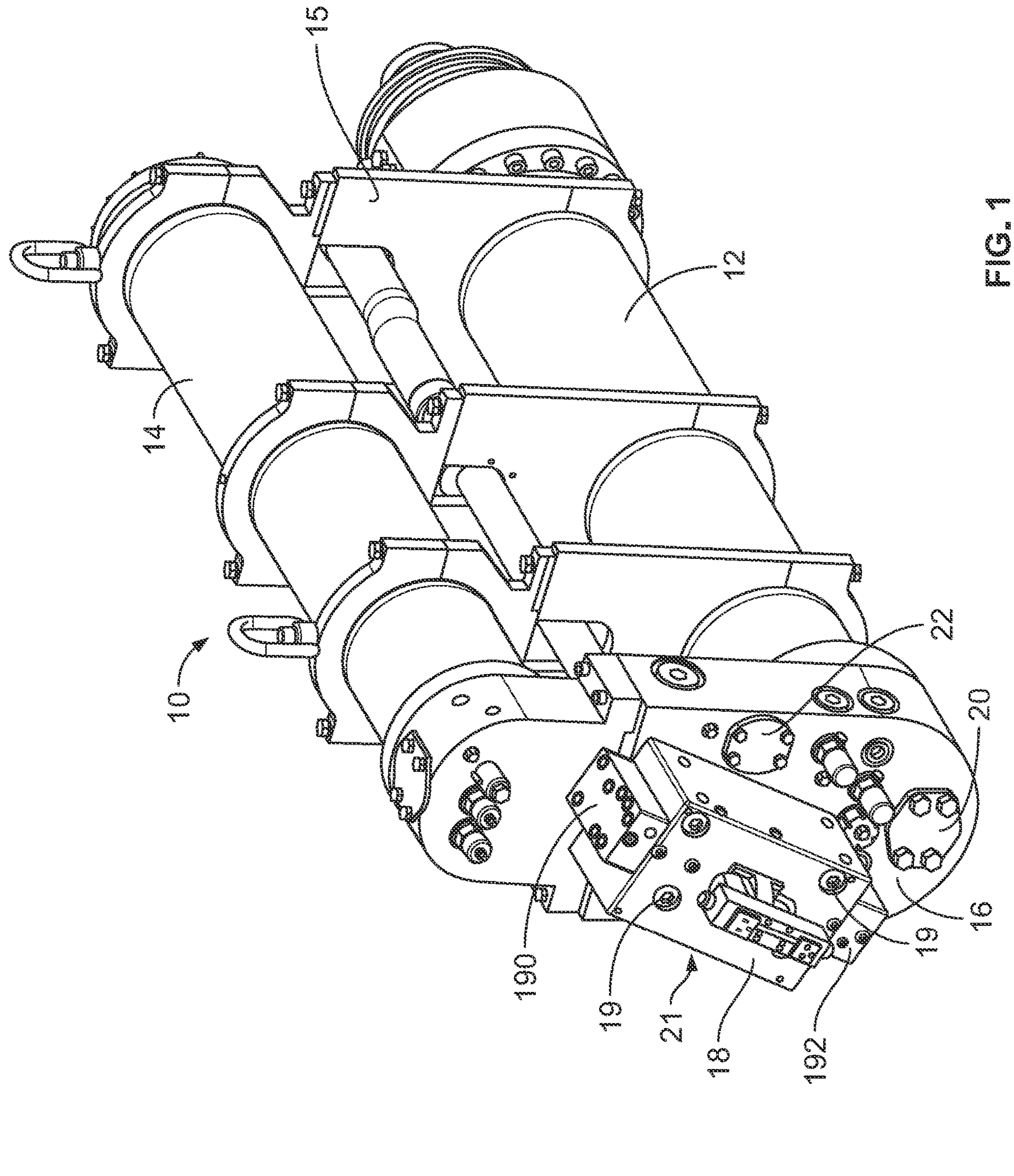
FIG. 1 is a perspective view of a hydraulic powering system according to the principles of the present disclosure.

The present disclosure relates to a hydraulic powering system that includes a hydraulic cylinder, an accumulator, and a manifold assembly providing hydraulic fluid communication between the hydraulic cylinder and the accumulator. The manifold assembly can also provide communication of the hydraulic fluid between a source of hydraulic fluid, such as a hydraulic pump, and the hydraulic powering system. In addition, the present disclosure relates to a method of operating the hydraulic powering system.

Herein, example hydraulic powering systems, hydraulic cylinders, accumulators, and manifold assemblies are characterized in detail. Many of the specific features can be applied to provide advantage. There is no specific requirement that the various individual features and components be applied in an overall assembly with all of the features and characteristics described, however, in order to provide for some benefit in accord with the present disclosure.

Hydraulic cylinders generally operate by transferring energy into a linear direction. Depending on the side of the hydraulic cylinder into which the hydraulic fluid is introduced or removed, a piston with a piston rod extending therefrom moves in an extension direction or a retraction direction. The operation can be referred to as an extend stroke or as a retract stroke. It is often desirable to enhance the performance by increasing the speed and/or force of the extend stroke or by increasing the speed and/or force of the retract stroke. Enhancing the performance can additionally include leveling or making more uniform the application of force and avoiding spikes that sometimes occur at the end of an extend stroke (or the beginning of a retract stroke) or at the end of a retract stroke (or the beginning of an extend stroke). Furthermore, enhancing the performance of the hydraulic cylinder may include enhancing the performance of the hydraulic pump associated with, or powering the hydraulic cylinder, by utilizing the energy stored in an accumulator. Furthermore, using the stored energy in the accumulator may help reduce the demands on the hydraulic pump that causes undue wear on the hydraulic pump. For example, increasing the speed of the extend stroke or increasing the speed of the retract stroke may result in hydraulic fluid not being pulled into the hydraulic pump fast enough thereby causing cavitation or starving of the hydraulic pump. That, in turn, can cause wear on the hydraulic pump and shorten its life, and can also result in decreased performance of the hydraulic cylinder. In addition, there is a considerable amount of momentum that must be reversed every time the hydraulic cylinder switches between the extend stroke or the retract stroke, and the valve operation of the hydraulic pump might not be fast enough to provide the desired level of performance. The accumulator can also help absorb pressure spikes that may occur during operation of the hydraulic powering system. Accordingly, it is desirable to enhance the performance of the hydraulic cylinder by adding a force that is available for increasing the speed and/or force of the extend stroke and/or the retract stroke.

Figure 2:
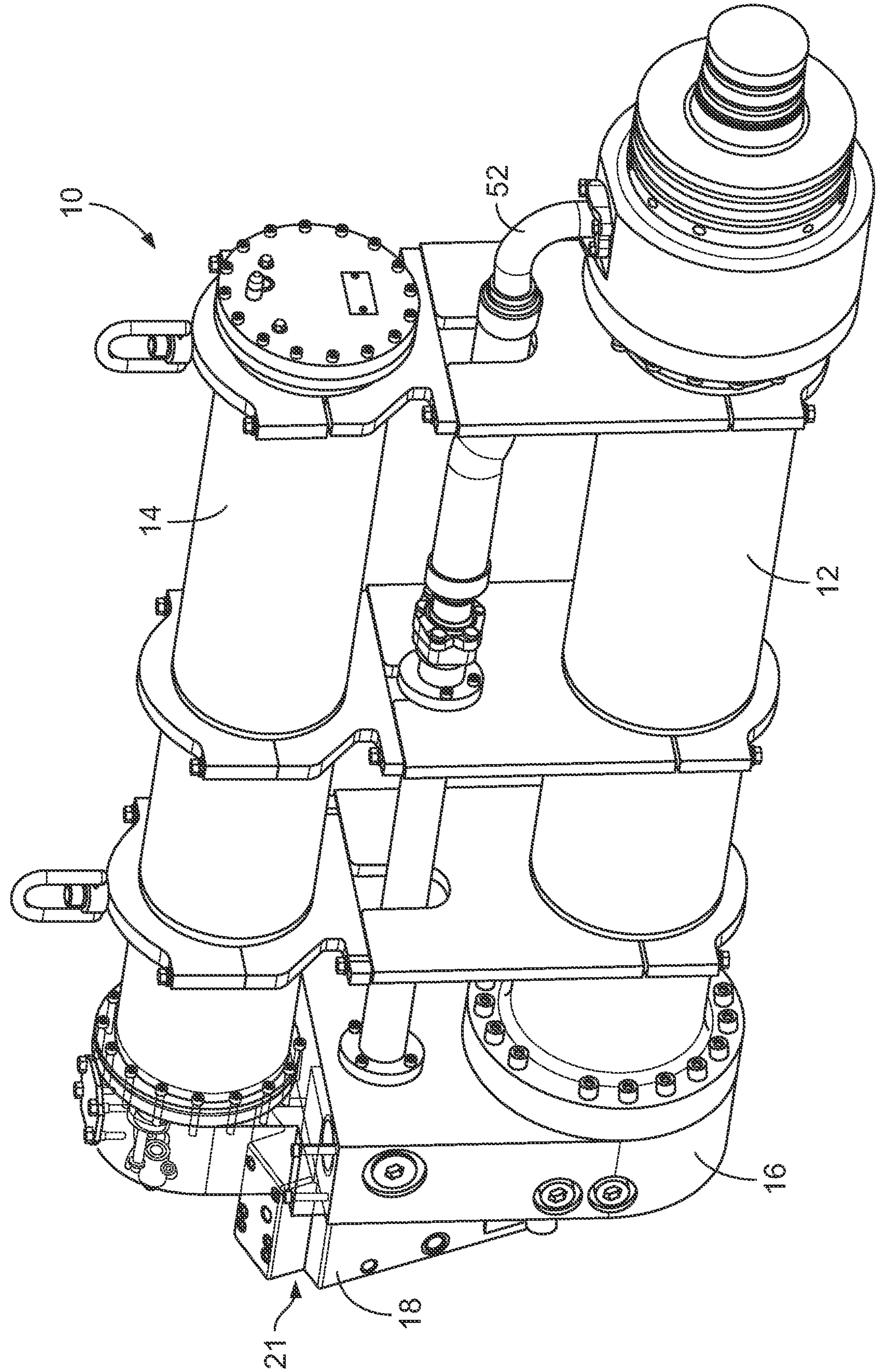
FIG. 2 is an alternative perspective view of the hydraulic powering system according to FIG. 1.
Figure 3:
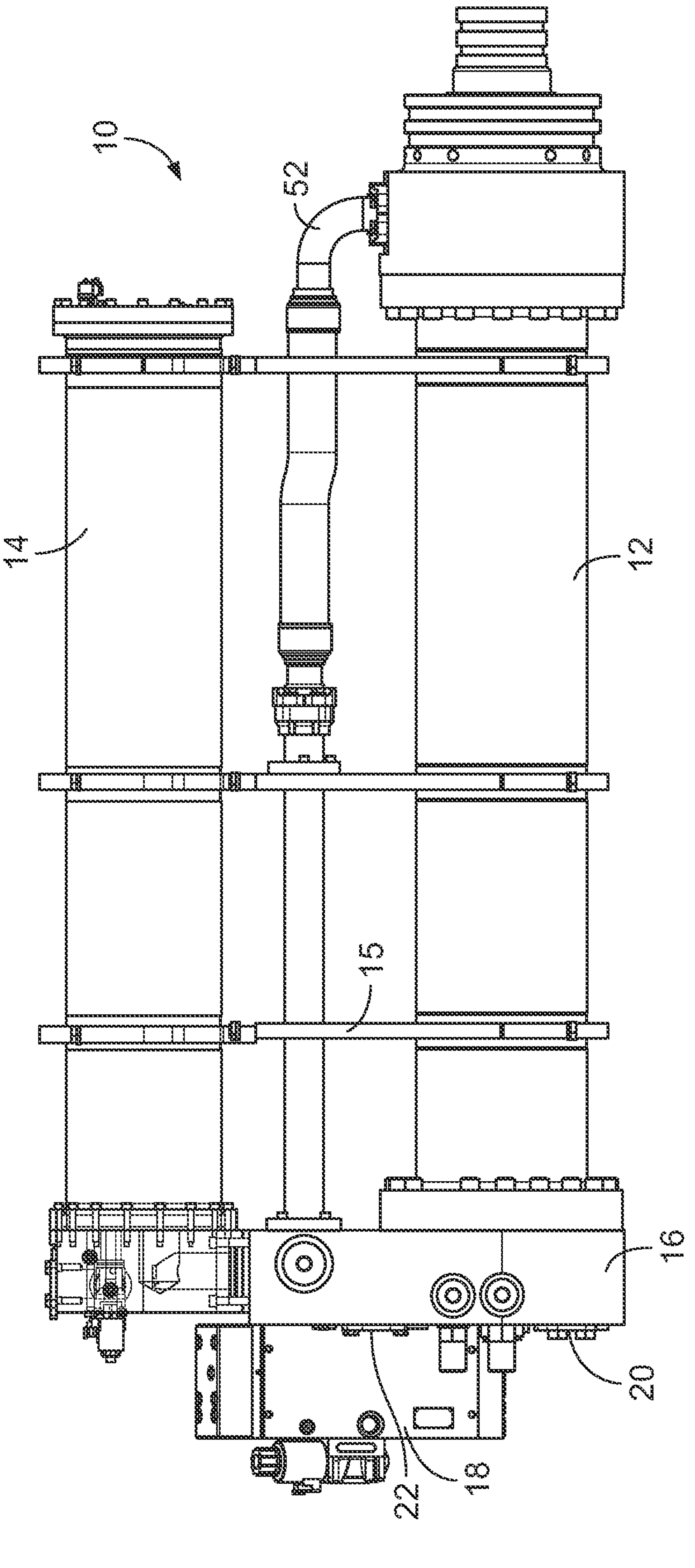
FIG. 3 is a side, plan view of the hydraulic powering system according to FIG. 1.

Now referring to FIGS. 1-3, a hydraulic powering system is illustrated at reference number 10. The hydraulic powering system 10 includes a hydraulic cylinder 12 and an accumulator 14. The hydraulic cylinder 12 and the accumulator 14 can operate from a source of hydraulic fluid, such as a hydraulic pump, that causes the hydraulic cylinder 12 to operate and also stores energy in the accumulator 14 that, in turn, can be drawn upon to assist in operating the hydraulic cylinder 12. The hydraulic cylinder 12 and the accumulator 14 can be held together by a bracket assembly 15. Variations of the bracket assembly 15 can be provided to help hold the accumulator 14 relative to the hydraulic cylinder 12.

The hydraulic powering system 10 includes a manifold assembly 16 that can control flow of hydraulic fluid to, from, and between the hydraulic cylinder 12 and the accumulator 14. In addition, the manifold assembly can control flow of hydraulic fluid between the manifold assembly and a source of hydraulic fluid. The source of hydraulic fluid can be a pump arrangement that provides hydraulic fluid under pressure and also receives hydraulic fluid that can be, in turn, returned under pressure. The manifold assembly 16 can include a valve construction 21, such as a valve arrangement 18, that directs flow of hydraulic fluid through the manifold assembly 16. The valve construction 21 can be provided as an integral part of the manifold assembly 16 where it is built into the manifold assembly 16, or the valve construction 21 can be provided as a separate structure that attaches to the manifold assembly 16. As depicted, the valve arrangement 18 is a structure that can be attached to the manifold assembly 16 via fasteners 19. An advantage of providing the valve construction 21 as a separate structure is that the manifold assembly 16 can be provided having greater flexibility in terms of varied applications. That is, the valve construction 21 can be replaced with an alternative to adjust the operation of the hydraulic powering system 10. In addition, servicing of the hydraulic powering system 10 can be enhanced by providing the valve construction 21 as a separate structure that can more easily be detached from the manifold assembly 16 to provide for more convenient servicing thereof due the moving parts in the valve construction 21 may require servicing more often than the remainder of the manifold assembly 16.

Figure 5:
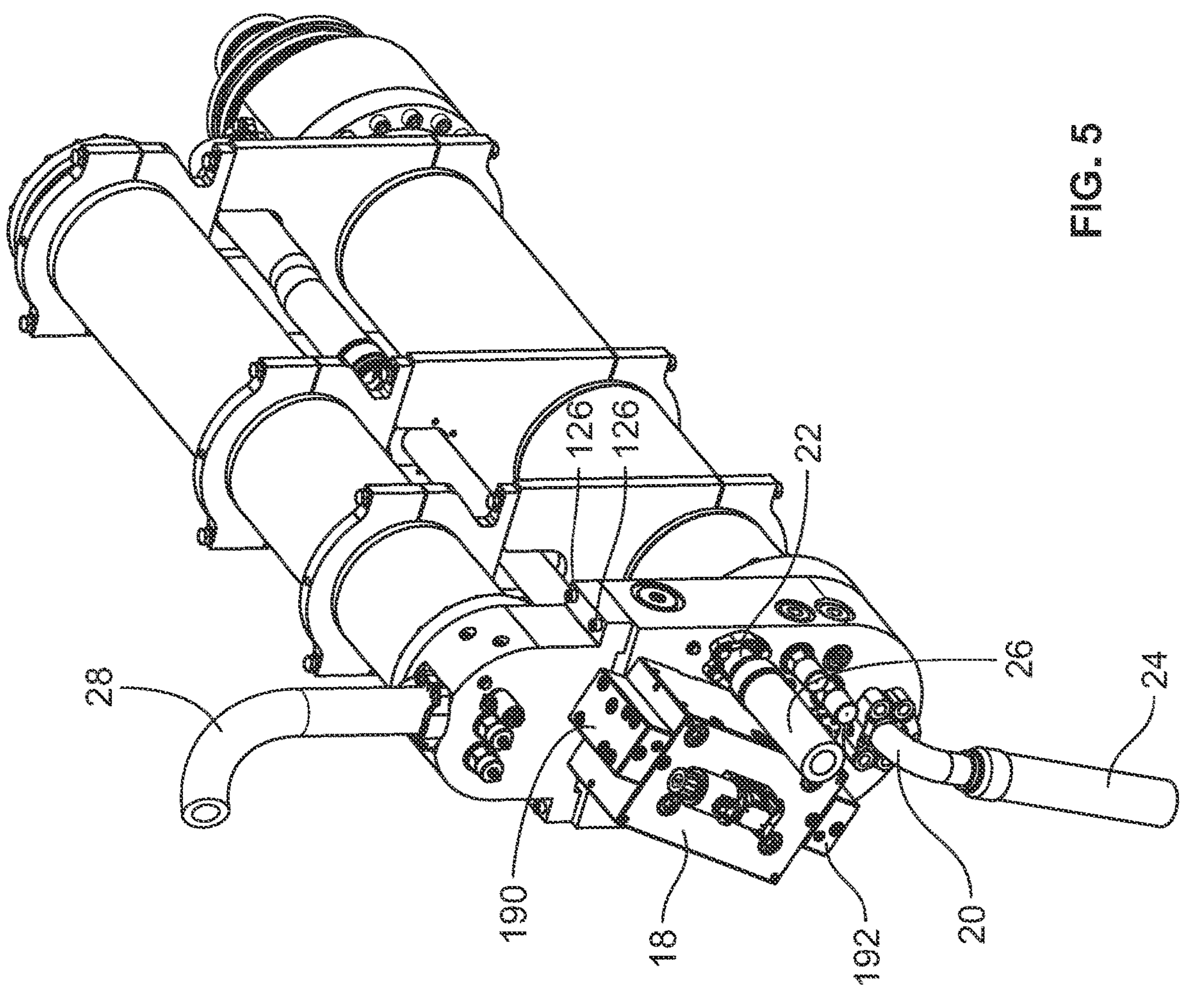
FIG. 5 is an additional perspective view of the hydraulic powering system according to FIG. 1.
Figure 6:
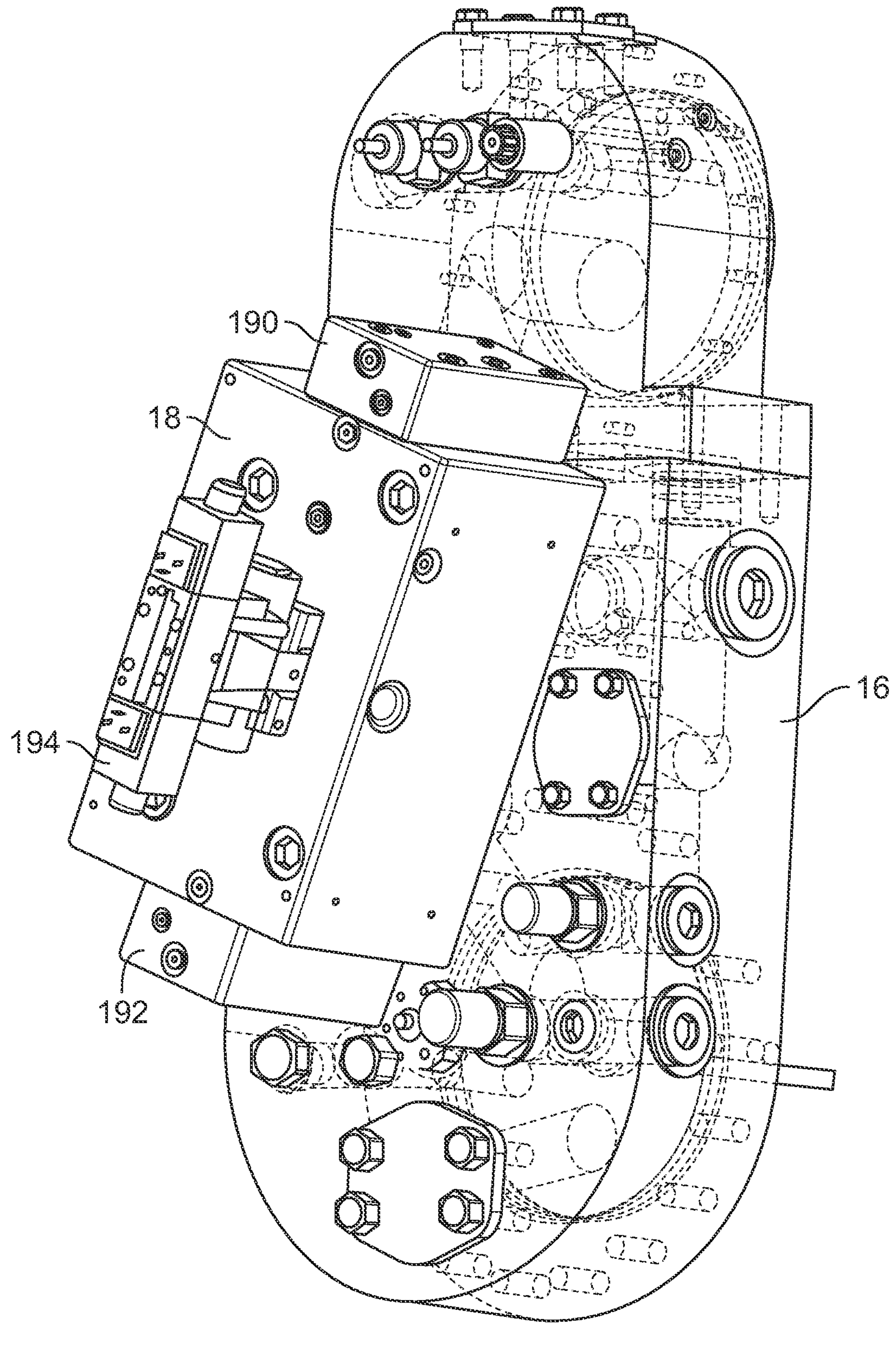
FIG. 6 is a perspective view of the manifold assembly of the hydraulic powering system according to FIG. 1 illustrating an exemplary internal conduit configuration.

The manifold assembly 16 includes an extend port 20 and a retract port 22. A hydraulic fluid powering source, such as a hydraulic fluid pump arrangement, can provide a fluid connection to the extend port 20 and the retract port 22 to operate the hydraulic powering system 10. The attachment can be via hydraulic lines. As illustrated in FIG. 5, the extend port 20 can be connected to a source of hydraulic fluid via an extend line 24, and the retract port 22 can be connected to a source of hydraulic fluid via the retract line 26. Also shown is a hydraulic fluid dump line 28 which is available for returning hydraulic fluid to a hydraulic fluid reservoir when pressure within the accumulator exceeds design limits.

Figure 4:
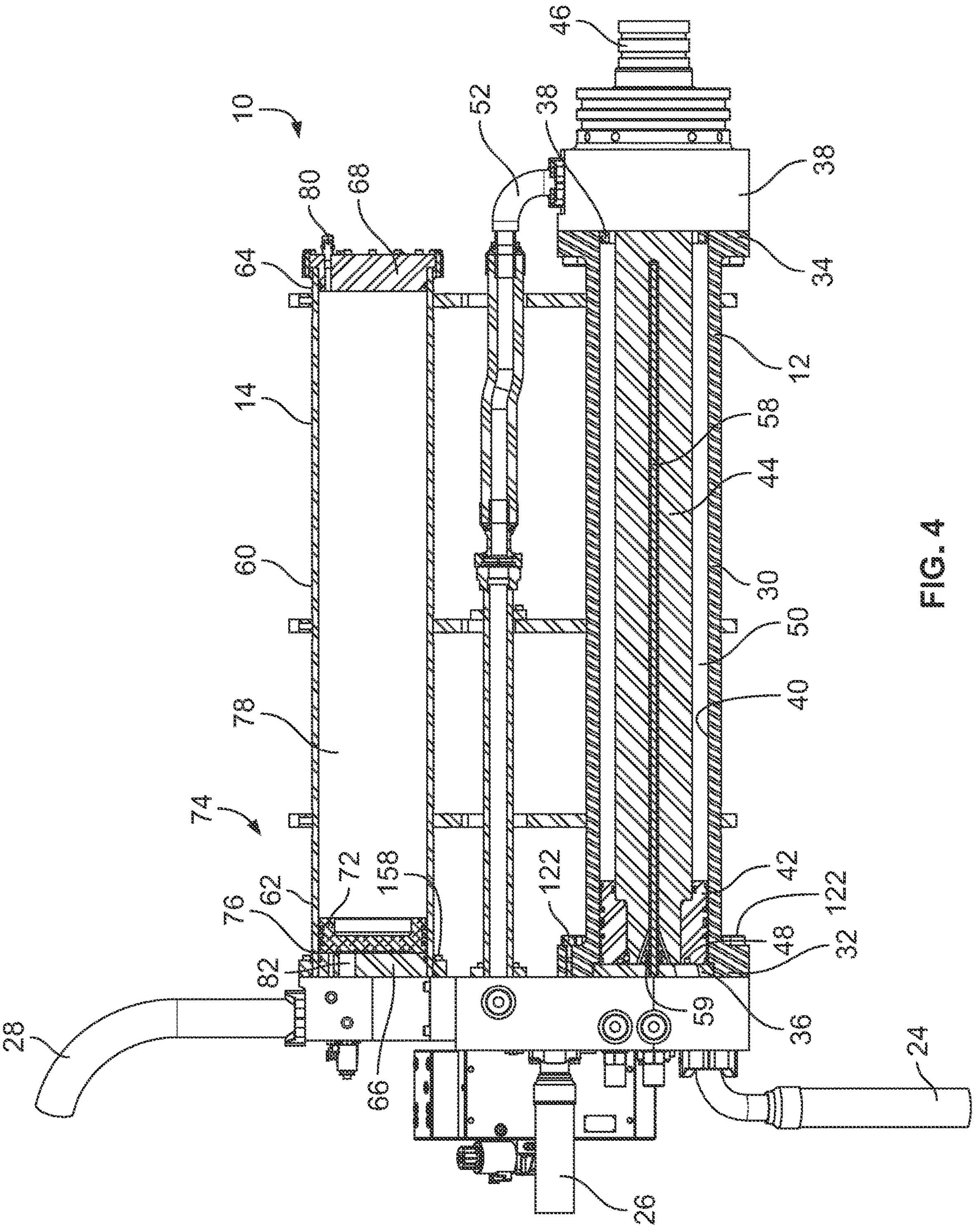
FIG. 4 is a partial sectional view of the hydraulic cylinder and the accumulator of the hydraulic powering system according to FIG. 1.

Now referring to FIG. 4, a partial sectional view of the hydraulic powering system 10 illustrates the operation of the hydraulic cylinder 12 and the accumulator 14. The hydraulic cylinder 12 includes a cylinder wall 30 extending from a hydraulic cylinder first end 32 to a hydraulic cylinder second end 34, a hydraulic cylinder first end cap 36 located at the hydraulic cylinder first end 32, and a hydraulic cylinder second end cap 38 located at the hydraulic cylinder second 34. The combination of the cylinder wall 30, the hydraulic cylinder first end cap 36, and the hydraulic cylinder second end cap 38 provides a hydraulic cylinder interior region 40. The cylinder wall 30 can have a cylindrical shape forming the cylinder interior region 40. Additionally included is a piston 42 that slides between the hydraulic cylinder first end 32 and the hydraulic cylinder second end 34 within the hydraulic cylinder interior region 40. Extending from the piston 42 is a piston rod 44 that extends through the hydraulic cylinder second end cap 38 and forms a piston rod end 46 that is available for connection to another device such as a frac pump.

Figure 4A:
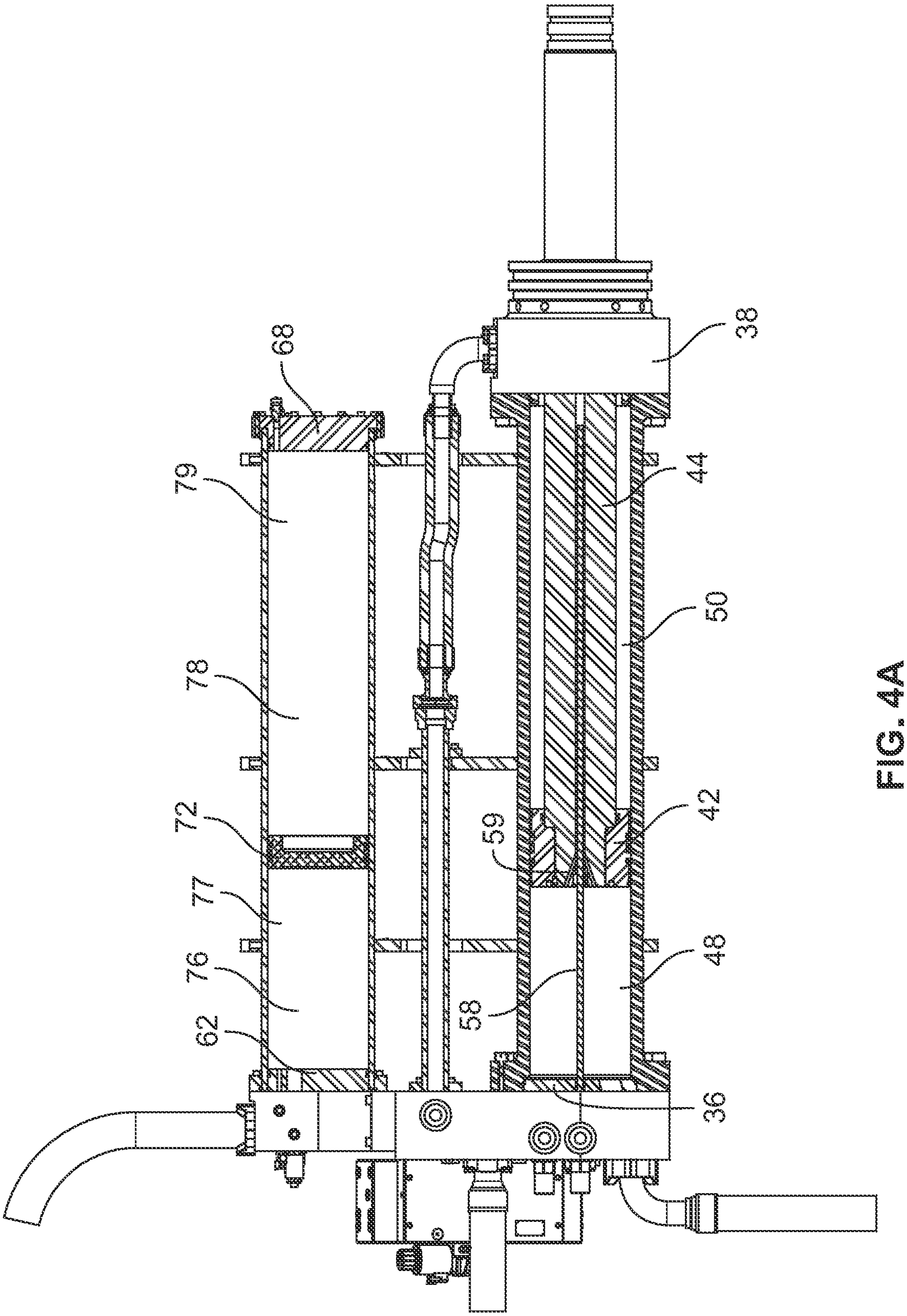
FIG. 4A is a partial sectional view of the hydraulic cylinder and the accumulator of the hydraulic powering system according to FIG. 4.

The hydraulic cylinder 12 is illustrated in FIG. 4 in a retracted position where the piston 42 is retracted toward the first end cap 36. In an extended position, the piston 42 would be located toward the second hydraulic cylinder end cap 34. The hydraulic cylinder interior region 40 can be divided into two regions that can be referred to as the extend region 48 and the retract region 50. The extend region 48 is located between the hydraulic cylinder first end cap 36 and the piston 42, and the retract region 50 is located between the hydraulic cylinder second end cap 38 and the piston 32. As the piston 42 moves toward the hydraulic cylinder second end cap 38 and toward an extended position, hydraulic cylinder fluid leaves the retract region 50 via the hydraulic fluid retract line 52, and hydraulic fluid enters into the extend region 48. In reverse, as the piston 42 moves from the hydraulic cylinder second end cap 38 toward the hydraulic cylinder first end cap 36, the hydraulic fluid enters into the retract region 50 via the hydraulic fluid retract line 52, and hydraulic fluid exits the extend region 48. It should be understood, however, that the precise flow of hydraulic fluid into and out of the extend region 48 and the retract region 50 will vary as a result of interaction with the accumulator 14 and the manifold assembly 16. The characterization that the piston moves toward the hydraulic cylinder first end cap 36 or the hydraulic cylinder second end cap 38 does not mean that the piston 42 actually contacts the hydraulic cylinder first end cap 36 or the hydraulic cylinder second end cap 38, but rather that the piston 42 moves in a direction that can be characterized as extension (an extend stroke) and retraction (a retract stroke). It may be possible that the piston 42 actually contacts the first hydraulic cylinder 36 and/or hydraulic cylinder second end cap 38 during the movement. Now referring to FIG. 4A, the piston 42 is located closer to the hydraulic cylinder second end cap 38 more clearly showing both the extend region 48 and the retract region 50.

The hydraulic cylinder 12 includes a position sensor 58 positioned within the piston rod 44, and an electronic sensor 59 that works with the position sensor 58 to identify where the piston or piston rod is at any time during a stroke. The position sensor 58 can be provided as a MTS brand sensor, and various position sensors for providing location information of a piston rod or a piston in a hydraulic cylinder are well known. Feedback from the piston rod 44 provides information useful that permits the valve arrangement to control flow of hydraulic fluid through the hydraulic powering system 10.

The accumulator 14 includes an accumulator wall 60 extending from an accumulator first end 62 to an accumulator second end 64, an accumulator first end cap 66 located at the accumulator first end 62, and an accumulator second end cap 68 located at the accumulator second end 64. The accumulator wall 60, the accumulator first end cap 66, and the accumulator second end cap 68 provide an accumulator interior region 70. The accumulator wall 60 can have a cylindrical shape forming the accumulator interior region 70. The accumulator 14 additionally includes a piston 72 that slides within the accumulator interior region 70 between the accumulator first end cap 66 and the accumulator second end cap 68. As shown, the piston 72 is in a discharged position 74 where the piston 72 is located adjacent the accumulator first end cap 66. The accumulator interior region 70 is divided into a first side region 76 and a second side region 78. The first side region 76 is located between the piston 72 and the accumulator first end cap 66, and the second side region 78 is located between the piston 72 and the accumulator second end cap 68. In general, the second side region 78 includes a compressible gas therein that can be fed into the second side region 78 via the gas charging port 80. The first side region 76 can be referred to as the hydraulic fluid region 77, and the second side region 78 can be referred to as the compressible gas region 79. In addition, because of the presence of a compressible gas within the second side region 78, it is expected that the piston 72 will not extend all the way to the accumulator second end cap 68. Now referring to FIG. 4A, the piston 72 is illustrated in a different position closer to the accumulator second end cap 68 and more clearly showing both first side region 76 or hydraulic fluid region 77 and the second side region 78 or compressible gas region 79.

The accumulator 14 can be operated by introducing hydraulic fluid into the first side region 76 between the accumulator first end 66 and the piston 72 and thereby causing the piston 72 to move toward the accumulator second end cap 68. The compressible gas within the second side region 78 becomes compressed as the piston 72 moves toward the accumulator second end cap 68. Compressing the gas in the second side region 78 stores energy that can later be released as the piston 72 is permitted to move toward the accumulator first end cap 66. As the piston 72 moves toward the accumulator first end cap 66, the gas in the second side region 78 expands and the hydraulic fluid exits the first side region 76.

It should be understood that the accumulator 14 illustrated is a piston accumulator because it involves the movement of the piston 72 within the accumulator interior region 70. The particular size of the exemplified accumulator 14 is about 12 gallons. Other types of the accumulators are available and can be used including bladder accumulators. In order to achieve a similar energy storage using a single bladder accumulator, the bladder accumulator would generally require a greater diameter. Alternatively, multiple accumulators can be arranged, for example, in series or in parallel, to provide the desired energy storage and output.

Now referring to FIGS. 6-11, the manifold assembly 16 includes several conduits or passageways therein for exchanging hydraulic fluid with the hydraulic cylinder 12 in the accumulator 14. The valve arrangement 18 interacts with the manifold assembly 16 via Port 1, Port 3, and Port 2. Port 2 can be referred to as a "common port" because it can provide a common connection between Port 2 and Port 1, and between Port 2 and Port 3. The valve arrangement 18 includes a valve system therein that controls flow through Ports 1-3. This is explained in more detail below. It should also be appreciated that a computer controller can be provided directing the operation of the valve arrangement 18.

The manifold assembly 16 includes two parts assembled together. The first part can be referred to as a cylinder base end 100 and the second part can be referred as an accumulator base end 102. The cylinder base end 100 is shown isolated in FIGS. 8 and 9, and the accumulator end 102 is shown isolated in FIGS. 10 and 11. It should be appreciated that the cylinder base end 100 and the accumulator end 102 can be provided as a single, integral structure. By separating the manifold assembly 16 into the cylinder base end 100 and the accumulator base end 102, it is easier to form the conduits or passageways there through for flow of hydraulic fluid and also for containing various relief valves. The cylinder base end 100 and the accumulator base end 102 are conveniently assembled together.

The cylinder base end 100 includes a plurality of bolt holes 120 for connection with the hydraulic cylinder 12 via the bolts 122 and includes bolt holes 124 for connection with the accumulator end 102 via bolts 126. Similarly, the accumulator base end 102 includes a plurality of bolt holes 123 for connection with the accumulator 14 via the bolts 123, and includes bolt holes 125 for connection with the hydraulic cylinder 12 via the bolts 126. While bolt holes and bolts are identified herein, it should be understood that various other fasteners can be used in place of or in combination with bolt holes and bolts.

Figure 7:
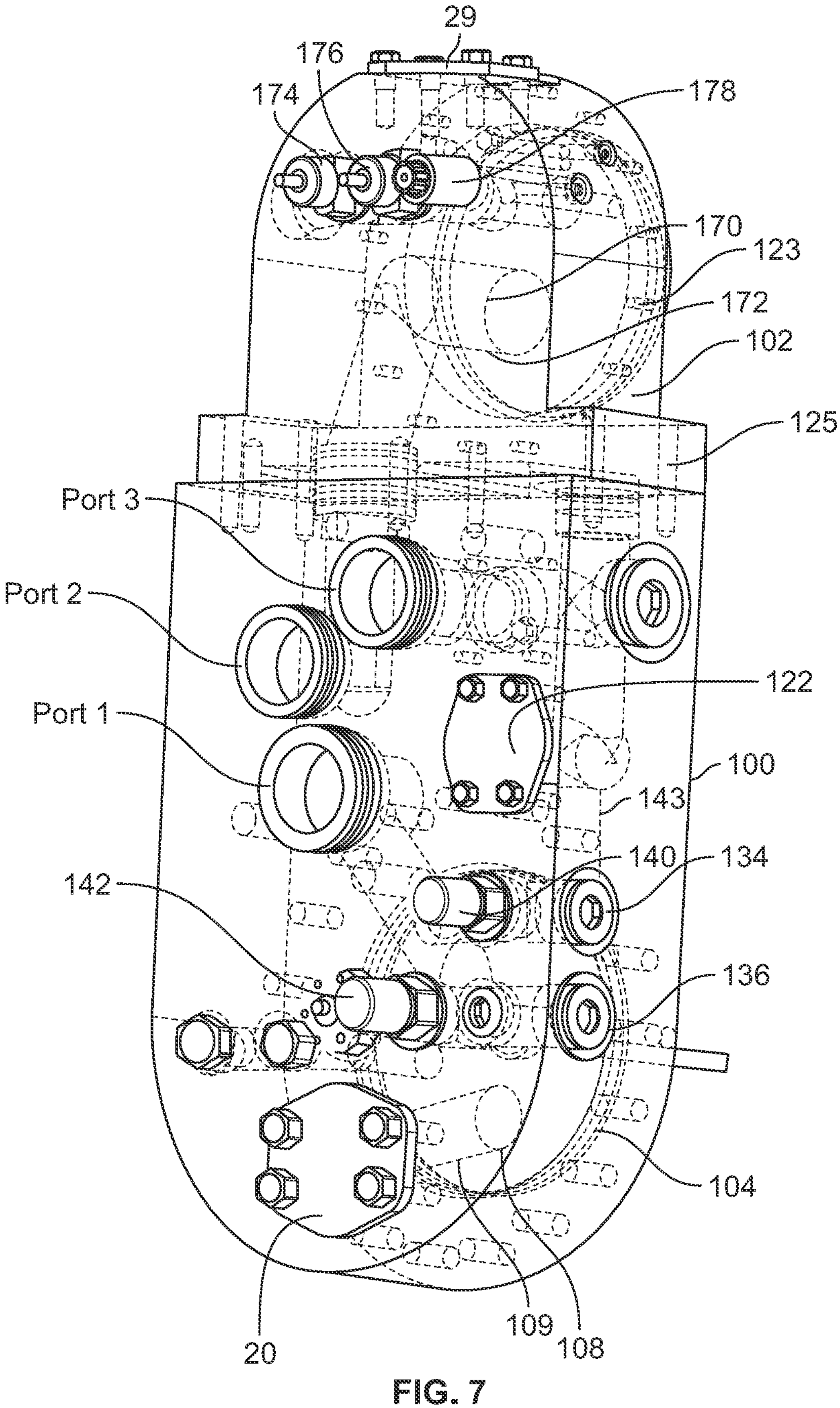
FIG. 7 is a perspective view of the manifold assembly of FIG. 1 without the valve arrangement.
Figure 8:
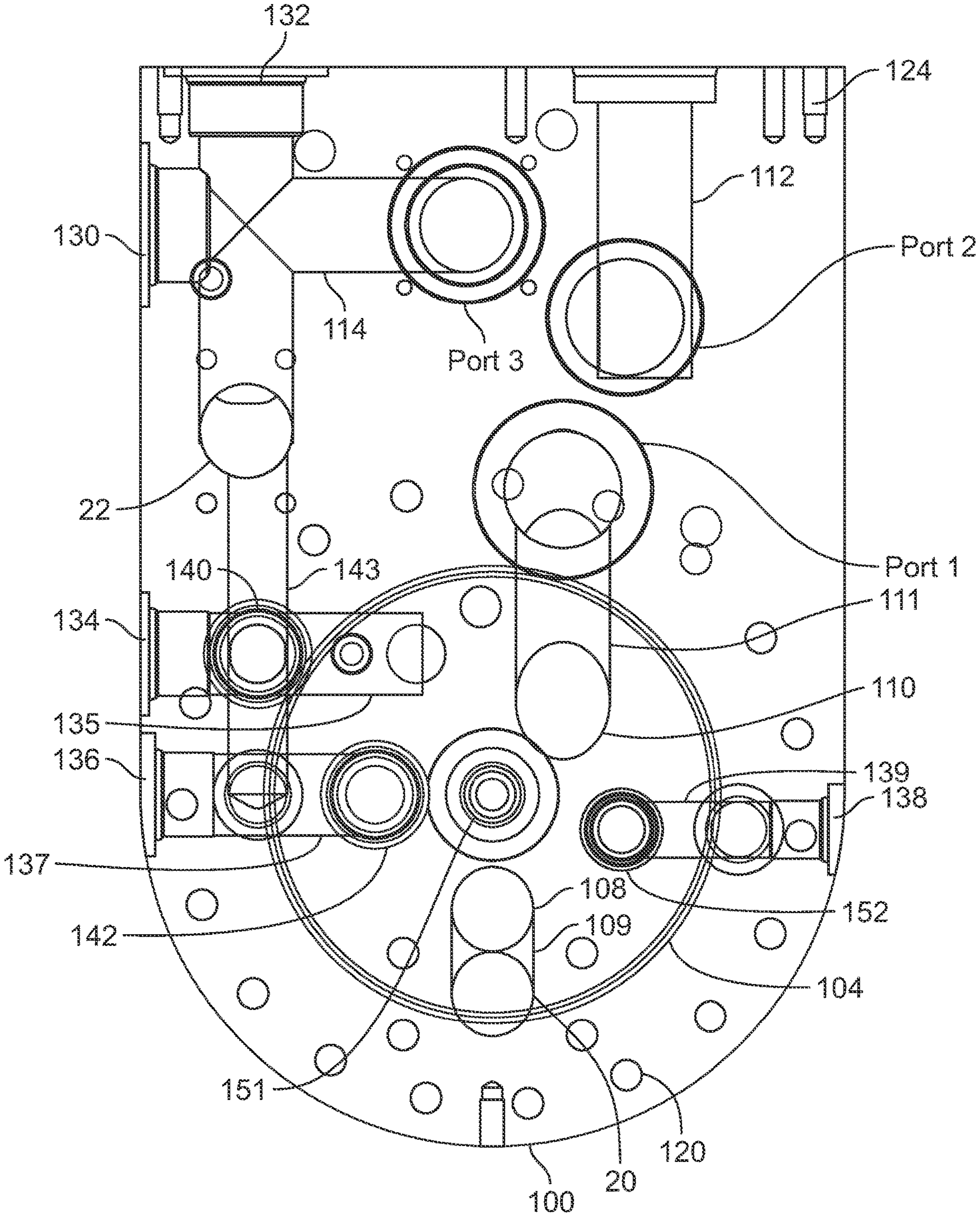
FIG. 8 is an end view of the cylinder base end of the manifold assembly according to FIG. 7 facing the hydraulic cylinder.
Figure 9:
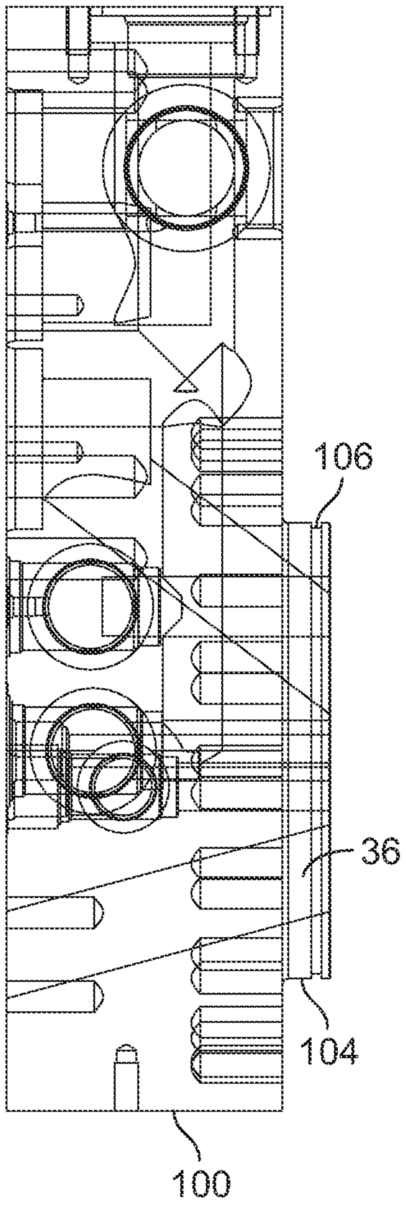
FIG. 9 is a side view of the cylinder base end of the manifold assembly according to FIG. 7.

Now referring to FIGS. 7-9, the cylinder base end 100 includes a flange or extension 104 that fits within the hydraulic cylinder first end 32. The flange or extension 104 can be provided as the hydraulic cylinder first end cap 36. In addition, the flange or extension 104 includes a groove 106 for receipt of a gasket or O-ring for creating a seal with the cylinder wall 30 at the cylinder wall front end 32. Hydraulic fluid can be introduced into the extend region 48, or removed therefrom, via the internal extend port 108 and/or the internal communication port 110. The internal extend port 108 is connected to the extend port 20 via the conduit 109, and the internal communication port 110 is connected to Port 1 via the conduit 111.

The cylinder base end includes Port 2 which is connected via conduit 112 to the first side region 76 of the accumulator 14, and Port 3 which is connect to the retract port 22 via the conduit 114.

Because the cylinder base end 100 and the accumulator base end 102 can be made from a solid metallic material such as steel, the conduits can be drilled out advantageously by drilling straight lines. The resulting openings can be plugged. For example, in order to create the conduit 114 between Port 3 and the retract port 22, a first conduit can be drilled out from the drill port 130 to the Port 3, and a second conduit can be drilled out from the drill port 132 to the retract port 22. The drill ports 130 and 132 can be plugged. Additional drill ports 134, 136, and 138 are identified that form conduits 135, 137, and 139.

Pressure control valves 140 and 142 are provided to regulate the pressure in the extend region 48 and in the retract region 50. The pressure control valves 140 and 142 can be provided as relief valves and/or as sequence valves. If the pressure control valve 140 is a relief valve and it is triggered, then hydraulic fluid can flow from the retract region 50 to the extend region 48 via conduit 135. If the pressure control valve 142 is a relief valve and it is triggered, the hydraulic fluid can flow from the extend region 48 to the retract region 50 via the conduits 137 and 143. The valves 140 and 142 include check valves that provide for one way flow of hydraulic fluid when the valves are triggered. The pressure control valves 140 and 142, when provided as relief valves, can be provided as 6,000 psi and 3,000 psi valves. It should be understood that the relief valves can be provided with desired any thresholds.

In addition, a through hole 151 can be provided for the position sensor 58 and 59, and a check valve 152 can be provided for make up hydraulic fluid when desired, such as when there is cavitation in the hydraulic cylinder.

Figure 10:
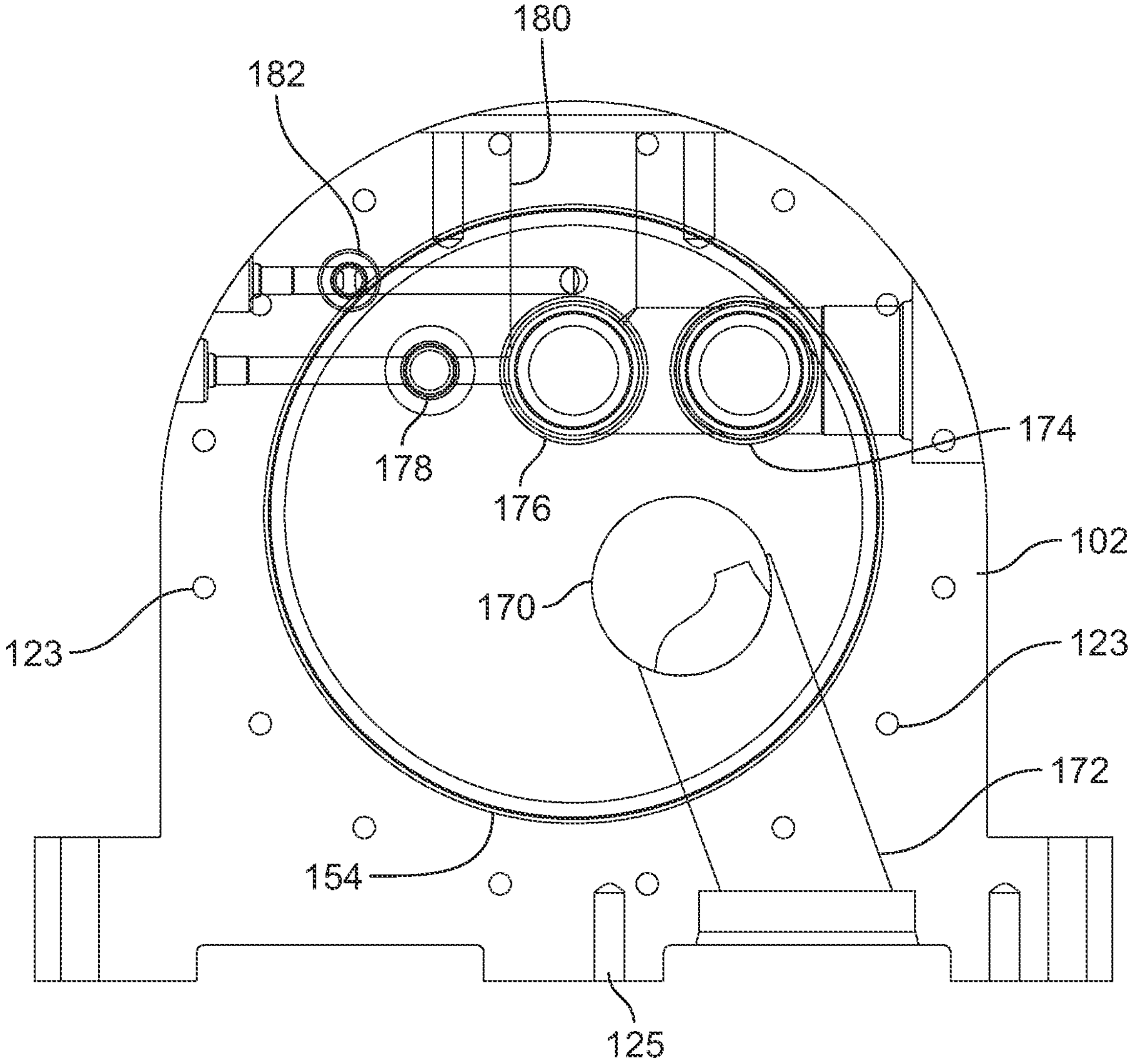
FIG. 10 is an end view of the accumulator base end of the manifold assembly according to FIG. 7 facing the accumulator.
Figure 11:
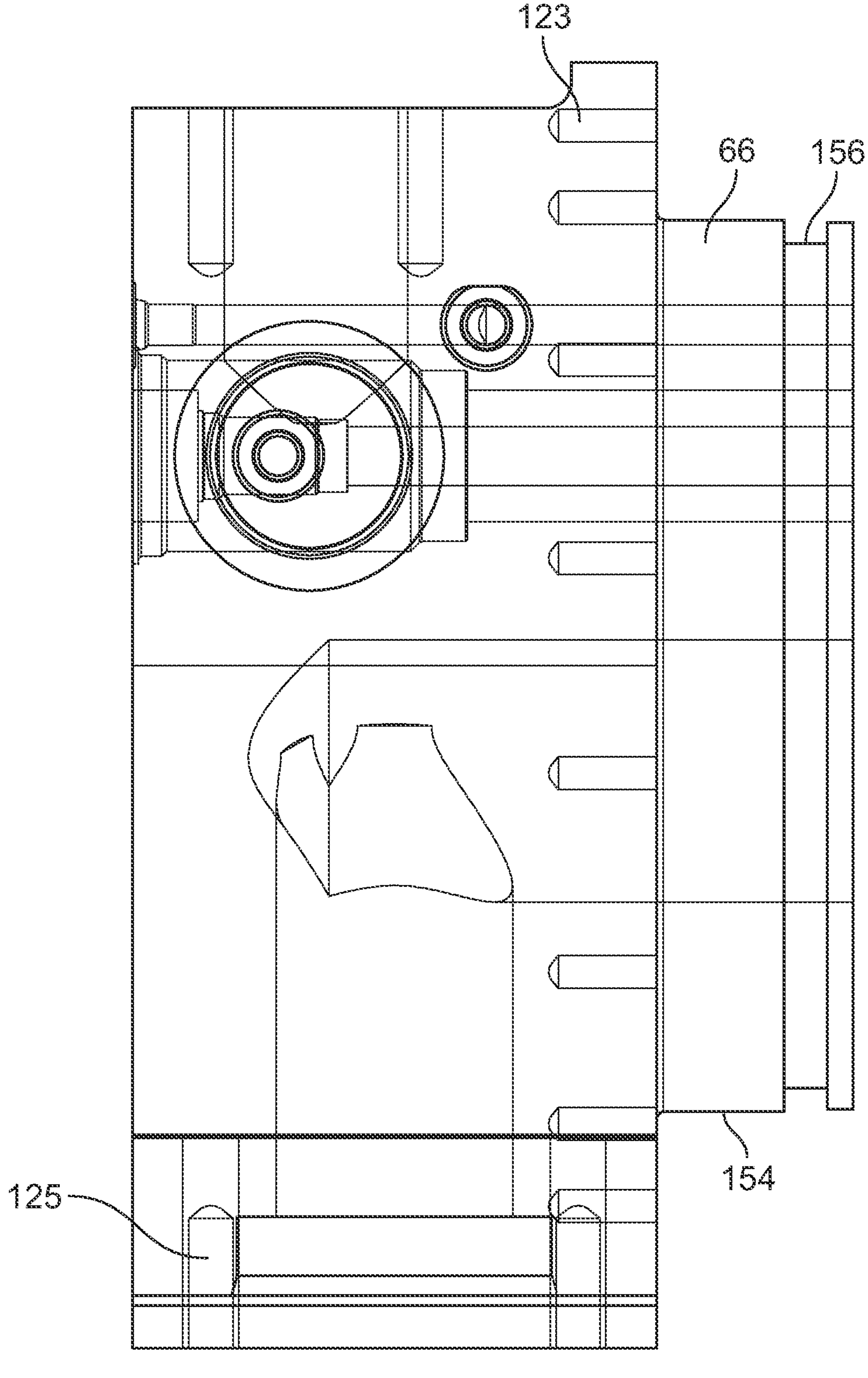
FIG. 11 is a side view of the accumulator base end of the manifold assembly according to FIG. 7.

The accumulator base end 102 is illustrated in FIGS. 7, 10, and 11. The accumulator base end 102 includes a flange or extension 154 that extends into the accumulator wall 60. The flange or extension 154 can be referred as the accumulator first end cap 66. In addition, the flange or extension 154 includes a groove 156 constructed to receive a gasket or O-ring to create a seal with the internal surface of the accumulator wall 60 when it is inserted therein.

The accumulator base end 102 includes an accumulator charge/discharge port 170. Hydraulic fluid flows through the accumulator charge/discharge port 170 when charging or discharging hydraulic fluid from the first side region 76. Hydraulic fluid flows to and from the accumulator charge/discharge port 170 via the conduit 172 which is in communication with the conduit 112 and Port B in the hydraulic cylinder base end 100. The accumulator base end 102 additionally includes pressure control valves 174 and 176, and a dump valve 178. The pressure control valves 174 and 176 can be provided as relief valves and/or as sequence valves. If the pressure control valves 174 and 176 are provided as relief valves, once a maximum pressure is triggered, then hydraulic fluid is permitted to flow from the first side region 76 via the conduit 180 and through the dump line 28. The relief valves 174 and 176 can be provided having check valves to provide one way flow. In addition, the relief valves 174 and 176 would work together to provide desired flow. The dump valve 178 permits bleeding of residual pressure if there is a power loss. As illustrated in FIG. 7, the extend port 20, the retract port 22, and the dump line port 29 are capped, but the caps are removed in place of extend line 24, retract line 26, and dump line 28 as shown in, for example, FIG. 4. Also included is a pressure sensor 182 for identifying and communicating pressure within the first side region 76 of the accumulator 14.

The valve construction 21 can be provided as a control valve. An example of a valve construction 21 that provides control is the valve arrangement 18 which is depicted in the form of a two position and three way valve. When desired, the valve arrangement 18 can provide a common connection between Port 1 and Port 2, and can provide a common connection between Port 2 and Port 3. The valve arrangement 18 can include a first spring chamber 190 and a second spring chamber 192. In general, the first and second spring chambers 190 and 192 include a spring that keeps a replaceable spool in position when the hydraulic powering system 10 in unpowered. In addition, the valve arrangement 18 can include a pilot valve 194 which provides oil to drive the valve arrangement 18. It should be appreciated that the valve arrangement 18 can be driven by a computer control system or other electronic means that takes into account the various operational parameters. It should be appreciated that the valve construction 21 can be provided as a control valve other than as a two position and three way valve. For example, the valve construction 21 can be provided as a plurality of valves, together or separate, that provide the desired control of hydraulic fluid flow through the manifold assembly 16. The plurality of valves can be arranged in parallel and/or series to provide the desired flow control.

An advantage of the hydraulic powering system 10 is that when the hydraulic pump is providing hydraulic fluid to the extend region 48 of the hydraulic cylinder 12, hydraulic fluid can also be directed to the first side region 76 of the accumulator 14 in order to charge the accumulator 14. In certain circumstances, the extend stroke of the hydraulic cylinder 12 can provide the desired work. The time of the retract stroke, in contrast, reduces the work interval. By accelerating the retract stroke, it may be possible to operate the hydraulic cylinder more efficiently. Accordingly, the hydraulic powering system 10 can rely upon the stored energy in the accumulator 14 to accelerate the movement of the piston 42 during the retract stroke. This is accomplished by permitting the hydraulic fluid from the first side region 76 of the accumulator 14 to flow via the hydraulic fluid retract line 52 into the retract region 50 of the hydraulic cylinder 12. This can occur when the valve arrangement 18 provides communication between Port 2 and Port 3.

By utilizing the manifold assembly, the use of hydraulic hoses can be minimized. Several problems result from using hydraulic hoses to provide connections between the source of hydraulic fluid and the hydraulic cylinder and the accumulator. One problem is that the hoses cause a mess of lines that can become tangled and may even be hooked up incorrectly. Another problem is that the hoses can wear more quickly and require replacement. Another problem is that the hoses are more susceptible to leaking and/or bursting which can cause safety and pollution concerns. The servicing of the hoses by periodic replacement or by addressing a hose rupture issue likely requires taking the hydraulic cylinder out of use thereby resulting in loss of productivity. Furthermore, the use of hoses can result in a loss of energy as a result of the expansion of the hoses being subject to relatively large internal pressures. An expansion as a result of application of pressure may result in loss of energy and also a loss in responsiveness. In high performance industrial equipment such as frac pumps, a decrease in responsiveness can cause a delay or reduction in performance. The conduits within the manifold assembly are not subject to expansion under pressure the same way as hoses. In addition, long runs of hoses can permit pressure drop to occur which is not desirable. The use of a manifold assembly according to the present disclosure addresses these problems and provides for better control.

Figure 12:
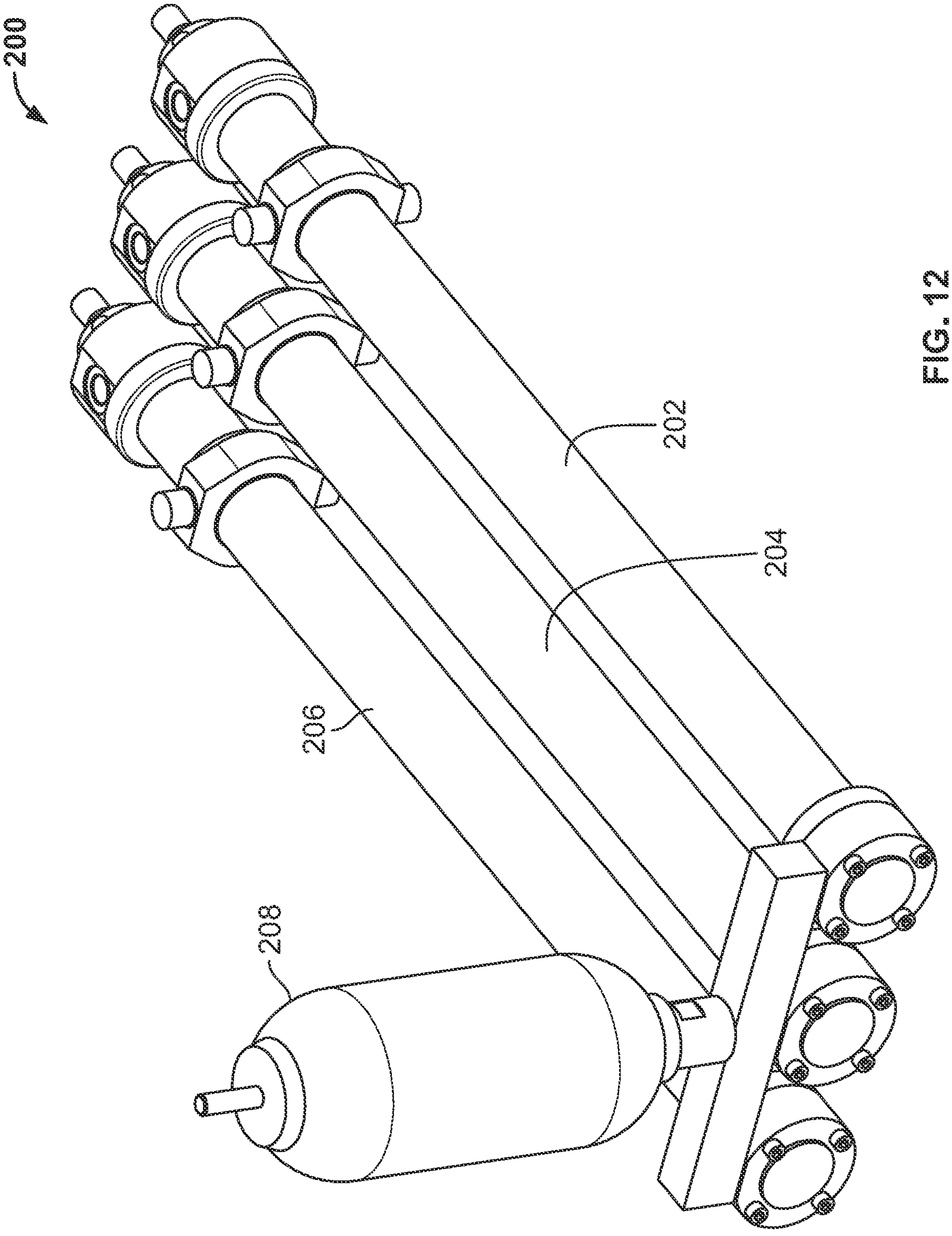
FIG. 12 is a perspective view of an alternative hydraulic powering system according to the principles of the present disclosure.
Figure 13:
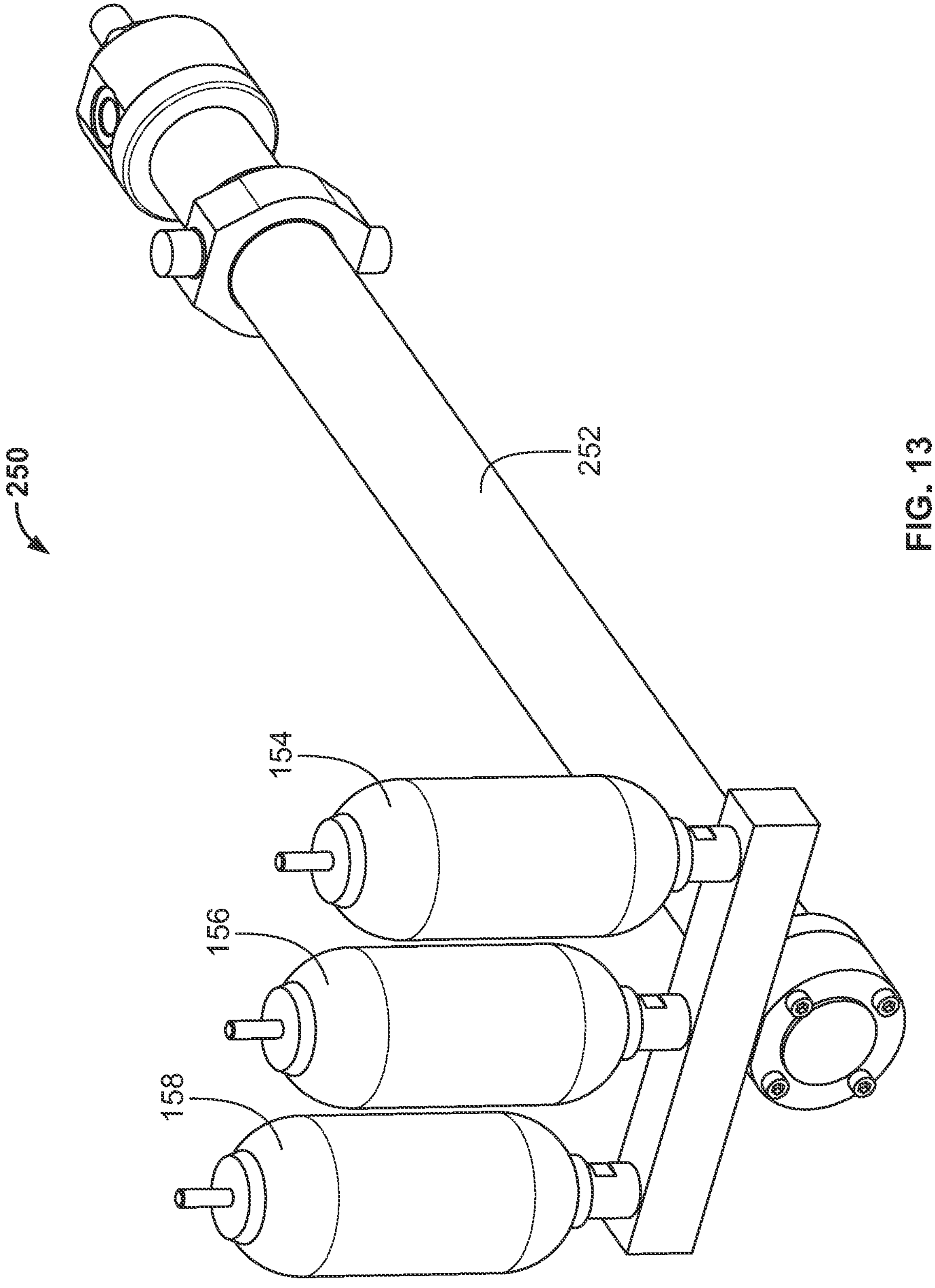
FIG. 13 is a perspective view of an alternative hydraulic powering system according to the principles of the present disclosure.

Now referring to FIGS. 12 and 13, alternative hydraulic powering systems are illustrated at reference number 200 and 250. In the hydraulic powering system 200, multiple hydraulic cylinders 202, 204, and 206 can be operated in conjunction with a single accumulator 208. Alternatively, in the hydraulic powering system 250, a single hydraulic cylinder 252 can be operated in conjunction with multiple accumulators including accumulator 154, accumulator 156, and accumulator 158. It should be appreciated that additional variations can be provided, and that the interaction between the hydraulic cylinders and the accumulators can be provided as describe previously.

Again, the principles, techniques, and features described herein can be applied in a variety of system, and there is no requirement that all of the advantageous features identified be incorporated in an assembly, system, method, or component to obtain some benefit according to the present disclosure.

It should be understood that various changes and modifications to the preferred embodiments described herein will be apparent to those skilled in the art. Such changes or modifications may be made without departing from the spirit and scope of the present invention and without diminishing its attendant advantages. It is, therefore, intended that such changes and modifications be covered by the appended claims.

What is claimed is:

1. A hydraulic powering system comprising:

(a) a hydraulic cylinder comprising:

(i) a hydraulic cylinder construction having a hydraulic cylinder wall and first and second hydraulic cylinder end caps forming an internal volume, a hydraulic cylinder piston constructed to slide within the internal volume between the first and second hydraulic cylinder end caps and dividing the internal volume into a first region and a second region, and a piston rod extending from the hydraulic cylinder piston and through one of the first and second end caps to outside the hydraulic cylinder;

(ii) a first region port in fluid connection with the first region of the hydraulic cylinder; and (iii) a second region port in fluid communication with the second region of the hydraulic cylinder;

(b) an accumulator comprising:

(i) an accumulator construction having an accumulator wall and first and second accumulator end caps forming an accumulator internal volume, an accumulator piston constructed to slide within the accumulator internal volume between the first and second accumulator end caps and dividing the accumulator internal volume into a hydraulic fluid region and a compressible gas region;

(ii) a hydraulic fluid port in fluid communication with the hydraulic fluid region of the accumulator;

(c) a manifold assembly comprising:

(i) a plurality of passageways therethrough providing fluid connection between the hydraulic cylinder second region port and the accumulator hydraulic fluid port; and (ii) a valve arrangement configured to direct flow of hydraulic fluid through the manifold assembly, wherein the valve arrangement is configured to direct the hydraulic fluid in the hydraulic fluid region of the accumulator toward the second region of the hydraulic cylinder to accelerate movement of the hydraulic cylinder piston at a beginning of a stroke of the hydraulic cylinder.

2. A hydraulic powering system according to claim 1 wherein:

(a) the manifold assembly provides fluid connection between the accumulator hydraulic fluid port and the hydraulic cylinder second region port.

3. A hydraulic powering system according to claim 2 further comprising:

(a) a conduit extending between the manifold assembly and the hydraulic cylinder second region port.

4. A hydraulic powering system according to claim 1 wherein:

(a) the manifold assembly provides fluid connection between the accumulator hydraulic fluid port and the hydraulic cylinder first region port.

5. A hydraulic powered system according to claim 1 wherein:

(a) the manifold assembly comprises a solid metallic material containing conduits therein.

6. A hydraulic powering system according to claim 1 wherein:

(a) the valve arrangement is integral with the manifold assembly.

7. A hydraulic powering system according to claim 1 wherein:

(a) the valve arrangement is a structure separable from the manifold assembly.

8. A hydraulic powering system according to claim 1 wherein:

(a) the valve arrangement is configured to direct the hydraulic fluid in the hydraulic fluid region of the accumulator toward the first region of the hydraulic cylinder to accelerate movement of the hydraulic cylinder piston at a beginning of a stroke of the hydraulic cylinder.

9. A hydraulic powering system according to claim 1 wherein:

(a) the manifold assembly is configured to provide fluid connection between a hydraulic fluid extend source and one of the hydraulic cylinder first region and the hydraulic cylinder second region.

10. A hydraulic powering system according to claim 1 wherein:

(a) the manifold assembly is configured to provide fluid connection between a hydraulic fluid retract source and one of the hydraulic cylinder first region and the hydraulic cylinder second region.

11. A method of operating a hydraulic powering system, the method comprising:

(a) feeding hydraulic fluid from an accumulator to a hydraulic cylinder side during a stroke of the hydraulic cylinder, wherein hydraulic powering system comprises:

(i) the hydraulic cylinder comprising:

(A) a hydraulic cylinder construction having a hydraulic cylinder wall and first and second hydraulic cylinder end caps forming an internal volume, a hydraulic cylinder piston constructed to slide within the internal volume between the first and second hydraulic cylinder end caps and dividing the internal volume into a first region and a second region, and a piston rod extending from the hydraulic cylinder piston and through one of the first and second end caps to outside the hydraulic cylinder;

(B) a first region port in fluid connection with the first region of the hydraulic cylinder; and (C) a second region port in fluid communication with the second region of the hydraulic cylinder;

(ii) the accumulator comprising:

(A) an accumulator construction having an accumulator wall and first and second accumulator end caps forming an accumulator internal volume, an accumulator piston constructed to slide within the accumulator internal volume between the first and second accumulator end caps and dividing the accumulator internal volume into a hydraulic fluid region and a compressible gas region;

(B) a hydraulic fluid port in fluid communication with the hydraulic fluid region of the accumulator; and (iii) a manifold assembly comprising:

(A) a plurality of passageways therethrough providing fluid connection between the hydraulic cylinder second region port and the accumulator hydraulic fluid port; and (B) a valve arrangement configured to direct flow of the hydraulic fluid through the manifold assembly, wherein the valve arrangement is configured to direct the hydraulic fluid in the hydraulic fluid region of the accumulator toward the second region of the hydraulic cylinder to accelerate movement of the hydraulic cylinder piston at a beginning of a stroke of the hydraulic cylinder.

12. A method of operating a hydraulic powering system according to claim 11, further comprising:

(a) feeding the hydraulic fluid between the manifold assembly and the accumulator hydraulic fluid port and the hydraulic cylinder second region port.

13. A method of operating a hydraulic powering system according to claim 12, further comprising:

(a) feeding the hydraulic fluid through a conduit extending between the manifold assembly and the hydraulic cylinder second region port.

14. A method of operating a hydraulic powering system according to claim 11, further comprising:

(a) feeding the hydraulic fluid between the manifold assembly and the accumulator hydraulic fluid port and the hydraulic cylinder second region port.

15. A method of operating a hydraulic powering system according to claim 11, further comprising:

(a) flowing the hydraulic fluid through the at least one passageways of the manifold assembly wherein the manifold assembly comprises a solid metallic material containing the passageways therein.

16. A method of operating a hydraulic powering system according to claim 11, further comprising:

(a) the valve arrangement is constructed to direct the hydraulic fluid in the hydraulic fluid region of the accumulator toward the second region of the hydraulic cylinder to accelerate movement of the hydraulic cylinder piston at a beginning of a stroke of the hydraulic cylinder.

17. A method of operating a hydraulic powering system according to claim 11, wherein:

(a) the manifold assembly is configured to provide fluid connection between a hydraulic fluid retract source and one of the hydraulic cylinder first region and the hydraulic cylinder second region.

* * * * *